United States Patent
Zhang et al.

(10) Patent No.: US 11,886,282 B2
(45) Date of Patent: Jan. 30, 2024

(54) RECOVERY METHOD FOR TERMINAL DEVICE STARTUP FAILURE AND TERMINAL DEVICE

(71) Applicant: Huawei Technologies Co., Ltd., Shenzhen (CN)

(72) Inventors: Liang Zhang, Shanghai (CN); Dechun Qi, Shenzhen (CN); Xiaoyan Zhou, Shenzhen (CN); Zhiqiang Li, Shanghai (CN); Liang Yu, Shenzhen (CN); Dengzhou Xia, Shenzhen (CN); Chunhua Hu, Dongguan (CN); Zhongsheng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/470,543

(22) Filed: Sep. 9, 2021

(65) Prior Publication Data
US 2022/0066862 A1   Mar. 3, 2022

Related U.S. Application Data

(63) Continuation of application No. 16/344,565, filed as application No. PCT/CN2016/103213 on Oct. 25, 2016, now Pat. No. 11,119,844.

(51) Int. Cl.
G06F 11/07    (2006.01)
G06F 11/00    (2006.01)
(Continued)

(52) U.S. Cl.
CPC ........ *G06F 11/0793* (2013.01); *G06F 9/4406* (2013.01); *G06F 9/44552* (2013.01);
(Continued)

(58) Field of Classification Search
CPC .............. G06F 9/4406; G06F 9/44552; G06F 11/0793; G06F 11/006; G06F 11/0742; G06F 11/0781; G06F 11/079; G06F 11/1417; G06F 11/1438; G06F 11/1441; G06F 11/2284
See application file for complete search history.

(56) References Cited

U.S. PATENT DOCUMENTS 7,257,714 B1    8/2007  Shen
9,678,762 B2 *  6/2017  Rosset ................ G06F 11/1417
(Continued)

FOREIGN PATENT DOCUMENTS

CN    101493776 A    7/2009
CN    101800675 A    8/2010
(Continued)

*Primary Examiner* — Matthew M Kim
*Assistant Examiner* — Kyle Emanuele
(74) *Attorney, Agent, or Firm* — Slater Matsil, LLP

(57) ABSTRACT

Embodiments of this application provide a recovery method for a terminal device startup failure and a terminal device. The method includes: determining that a failure indication event occurs in a startup process, where the failure indication event is used to indicate a startup failure; determining at least one recovery policy based on a type of the failure indication event and/or a cause of the failure indication event; and performing startup recovery based on the at least one recovery policy.

20 Claims, 7 Drawing Sheets

```
┌─────────────────────────────────────────────────┐
│ Determine that a failure indication event       │
│ occurs in a startup process                     │── 201
└─────────────────────────────────────────────────┘
                        │
┌─────────────────────────────────────────────────┐
│ Determine at least one recovery policy based    │
│ on a type of the failure indication event       │── 202
│ and/or a cause of the failure indication event  │
└─────────────────────────────────────────────────┘
                        │
┌─────────────────────────────────────────────────┐
│ Perform startup recovery based on the at least  │── 203
│ one recovery policy                             │
└─────────────────────────────────────────────────┘
```

(51) Int. Cl.
*G06F 11/22* (2006.01)
*G06F 9/4401* (2018.01)
*G06F 9/445* (2018.01)
*G06F 11/14* (2006.01)

(52) U.S. Cl.
CPC .......... *G06F 11/006* (2013.01); *G06F 11/079* (2013.01); *G06F 11/0742* (2013.01); *G06F 11/0781* (2013.01); *G06F 11/1417* (2013.01); *G06F 11/1438* (2013.01); *G06F 11/1441* (2013.01); *G06F 11/2284* (2013.01)

(56) References Cited

U.S. PATENT DOCUMENTS

| | | | |
|---|---|---|---|
| 10,866,623 B2* | 12/2020 | Chaiken | ................ G06F 9/4418 |
| 2006/0143431 A1 | 6/2006 | Rothman et al. | |
| 2012/0290884 A1 | 11/2012 | Hamaguchi | |
| 2013/0191342 A1 | 7/2013 | Sreedharan | |
| 2014/0095921 A1 | 4/2014 | Kobayashi et al. | |
| 2015/0082088 A1 | 3/2015 | Nagasubramaniam et al. | |
| 2015/0100819 A1 | 4/2015 | Fedorov et al. | |
| 2016/0224428 A1 | 8/2016 | Lo | |
| 2016/0378603 A1* | 12/2016 | Herzi | ................... G06F 11/2284 714/6.12 |
| 2017/0269659 A1* | 9/2017 | Chen | ...................... G06F 1/263 |
| 2018/0074884 A1* | 3/2018 | Cady | ................... G06F 11/0787 |
| 2018/0088963 A1* | 3/2018 | Arora | ................... G06F 9/4406 |

FOREIGN PATENT DOCUMENTS

| | | |
|---|---|---|
| CN | 101854428 A | 10/2010 |
| CN | 102722389 A | 10/2012 |
| CN | 103136072 A | 6/2013 |
| CN | 103259905 A | 8/2013 |
| CN | 103645972 A | 3/2014 |
| CN | 103853584 A | 6/2014 |
| CN | 105224416 A | 1/2016 |
| CN | 105373440 A | 3/2016 |
| CN | 105573864 A | 5/2016 |
| CN | 105955773 A | 9/2016 |
| EP | 0974903 A2 | 1/2000 |
| WO | 2015166510 A1 | 11/2015 |

* cited by examiner

RECOVERY METHOD FOR TERMINAL DEVICE STARTUP FAILURE AND TERMINAL DEVICE

CROSS-REFERENCE TO RELATED APPLICATIONS

This application is a continuation of U.S. patent application Ser. No. 16/344,565, filed on Apr. 24, 2019, which is a national stage of International Application No. PCT/CN2016/103213, filed on Oct. 25, 2016. Both of the aforementioned applications are hereby incorporated by reference in their entireties.

TECHNICAL FIELD

This application relates to the communications field, and more specifically, to a recovery method for a terminal device startup failure and a terminal device.

BACKGROUND

With advancement of technologies, a mobile terminal device evolves from an original functional terminal to a current intelligent terminal, and corresponding software complexity explosively increases. The complexity can be clearly embodied in a startup process of a terminal device. For example, images and services that need to be loaded for running and components that need to be initialized obviously increase, and security check requirements, a transaction concurrency probability, and a startup failure probability significantly increase. Because many users increasingly rely on mobile intelligent terminals such as smartphones, if startup of a mobile intelligent terminal fails, users' life and work are severely disturbed.

Currently, in the case of a startup failure, a user usually needs to manually enter a security mode, or a terminal device needs to automatically restart for recovery.

SUMMARY

Embodiments of this application provide a recovery method for a terminal device startup failure and a terminal device, to select proper startup recovery policies for different startup failure cases, so as to improve a success rate of startup recovery.

According to a first aspect, an embodiment of this application provides a recovery method for a terminal device startup failure, and the method includes: determining that a failure indication event occurs in a startup process, where the failure indication event is used to indicate a startup failure; determining at least one recovery policy based on a type of the failure indication event and/or a cause of the failure indication event; and performing startup recovery based on the at least one recovery policy.

In this embodiment of this application, the terminal device may determine the at least one recovery policy based on the type of the failure indication event and/or the cause of the failure indication event, and can select proper startup recovery policies for different startup failure cases, instead of performing recovery only in a restart manner. This improves a success rate of startup recovery.

In addition, an automatic startup recovery process can be performed, and a user does not need to enter a security mode manually. This improves user experience.

Optionally, in this embodiment of this application, before the terminal device determines the at least one recovery policy based on the type of the failure indication event and/or the cause of the failure indication event, the terminal device needs to determine the type of the failure indication event and/or the cause of the failure indication event.

In a possible implementation, the determining at least one recovery policy based on a type of the failure indication event and/or a cause of the failure indication event includes: determining, based on the type of the failure indication event and/or the cause of the failure indication event, the at least one recovery policy corresponding to the type of the failure indication event and/or the cause of the failure indication event.

Optionally, there is a direct mapping relationship between the type of the failure indication event and/or the cause of the failure indication event and the at least one recovery policy, and the at least one recovery policy corresponding to the type of the failure indication event or the cause of the failure indication event may be determined based on the type of the failure indication event and the mapping relationship or based on the cause of the failure indication event and the mapping relationship.

Optionally, the mapping relationship may be embodied by using a mapping list.

In this case, the terminal device may directly determine the at least one corresponding recovery policy based on the mapping relationship, and an implementation process is simple and effective.

In a possible implementation, the type of the failure indication event includes at least one of a preset fault, a startup timeout, a user force restart, and a system crash restart.

Optionally, when a preset fault occurs, the terminal device may determine that the type of the failure indication event is the preset fault; when a startup timeout occurs, the terminal device may determine that the type of the failure indication event is the startup timeout; when a user force restart occurs, the terminal device may determine that the type of the failure indication event is the user force restart; or when a system crash restart occurs, the terminal device may determine that the type of the failure indication event is the system crash restart.

In a possible implementation, the user force restart includes touching and holding a power button, pressing a preset combination of buttons, and pulling out a battery.

In a possible implementation, the determining at least one recovery policy based on a type of the failure indication event and/or a cause of the failure indication event includes: when the failure indication event is the system crash restart, determining the at least one recovery policy based on a crash cause of the system crash restart.

In a possible implementation, the method further includes: determining a startup stage at which the failure indication event occurs.

The determining at least one recovery policy based on a type of the failure indication event and/or a cause of the failure indication event includes: determining the at least one recovery policy based on the type of the failure indication event and the startup stage or based on the cause of the failure indication event and the startup stage. Optionally, the startup stage may include a boot loading stage, an operating system kernel boot stage, a core service boot stage, and an application stage, and the terminal device successively undergoes the four startup stages in a startup process.

Optionally, the terminal device may record, by using a nonvolatile memory, a startup stage at which the terminal device restarts.

In this case, because a same failure indication event may occur in different startup stages, and at least one corresponding recovery policy varies in different startup stages, the at least one recovery policy needs to be determined based on the startup stages, so as to determine a more proper recovery policy.

In a possible implementation, the performing startup recovery based on the at least one recovery policy includes: performing startup recovery based on a preset execution sequence of the at least one recovery policy, until a first application program starts or all recovery policies in the at least one recovery policy fail in recovery.

Optionally, in this embodiment of this application, the terminal device may randomly select a recovery policy from the at least one recovery policy to perform recovery.

Optionally, in this embodiment of this application, the terminal device may select a recovery policy with a highest recovery success rate from the at least one recovery policy to perform recovery.

In a possible implementation, the method further includes: after startup recovery is performed based on a first recovery policy in the at least one recovery policy, generating a startup log corresponding to the first recovery policy, where the startup log includes at least one of the type of the failure indication event, the startup stage at which the failure indication event occurs, a fault log, the first recovery policy, and a corresponding recovery result; when the recovery fails, saving the startup log; and when the recovery succeeds, uploading, to a log statistics and measurement system, the startup log and a saved startup log of a recovery policy that is in the at least one recovery policy and that fails in recovery.

Optionally, the terminal device may save the startup log to a nonvolatile memory, so that the terminal device can still obtain the startup log in a re-startup process.

Optionally, when a quantity of saved startup logs is greater than or equal to a maximum quantity of logs, the terminal device deletes a startup log that has been stored for the longest time.

Optionally, the log statistics and measurement system determines, based on a received startup log, at least one of a startup failure ratio, a startup failure type or cause ratio, a recovery effective ratio, or a recovery policy effective ratio.

In this case, an administrator or a designer may improve the startup process of the terminal device based on statistical data in the log statistics and measurement system.

In a possible implementation, the at least one recovery policy is at least one recovery policy selected from the following recovery policies: a system or service restart, backup system enabling, safe recovery for user data, a factory reset, and an online system update.

In a possible implementation, if the type of the failure indication event is the preset fault, and the preset fault is that boot of system kernel image check fails or a system kernel image partition is damaged, the at least one recovery policy is the online system update.

In a possible implementation, if the type of the failure indication event is the preset fault, and the preset fault is that boot of a core service fails, based on the preset execution sequence, the at least one recovery policy is successively: the safe recovery for user data, the factory reset, and the online system update.

In a possible implementation, if the type of the failure indication event is the preset fault, and the preset fault is that a data partition is damaged or a data partition is read-only, based on the preset execution sequence, the at least one recovery policy is successively: the system or service restart, the safe recovery for user data, the factory reset, and the online system update.

In a possible implementation, if the type of the failure indication event is the startup timeout or the user force restart, based on the preset execution sequence, the at least one recovery policy is successively: the system or service restart, the backup system enabling, the safe recovery for user data, the factory reset, and the online system update.

According to a second aspect, an embodiment of this application provides a terminal device, configured to perform the method in the first aspect or any possible implementation of the first aspect. Specifically, the terminal device includes modules and units for performing the method in the first aspect or any possible implementation of the first aspect.

According to a third aspect, an embodiment of this application provides a terminal device startup detection and recovery system, configured to perform the method in the first aspect or any possible implementation of the first aspect. Specifically, the terminal device includes modules and units for performing the method in the first aspect or any possible implementation of the first aspect.

According to a fourth aspect, an embodiment of this application provides a terminal device, and the terminal device includes the terminal device startup detection and recovery system in the third aspect, a display panel, a read-only memory, a random access memory, a register, a timer, and at least one button.

According to a fifth aspect, an embodiment of this application provides a terminal device, configured to perform the method in the first aspect or any possible implementation of the first aspect, and the terminal device includes a processor, a memory, and a transceiver. The processor, the memory, and the transceiver are connected by using a bus system, the memory is configured to store an instruction, the transceiver is configured to receive and send information, and the processor is configured to execute the instruction stored in the memory.

The processor is configured to determine that a failure indication event occurs in a startup process, where the failure indication event is used to indicate a startup failure.

The processor is configured to determine at least one recovery policy based on a type of the failure indication event and/or a cause of the failure indication event.

The processor is configured to perform startup recovery based on the at least one recovery policy.

According to a sixth aspect, an embodiment of this application provides a computer readable medium, configured to store a computer program, and the computer program includes an instruction for performing the method in the first aspect or any possible implementation of the first aspect.

BRIEF DESCRIPTION OF THE DRAWINGS

To describe the technical solutions in the embodiments of this application more clearly, the following briefly introduces the accompanying drawings required for describing the embodiments of this application. Apparently, the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

It should be understood that a terminal device in the embodiments of this application may be user equipment ("UE" for short), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol ("SIP" for short) phone, a wireless local loop ("WLL" for short) station, a personal digital assistant ("PDA" for short), a handheld device having a wireless communication function, a computing device, another processing device connected to a wireless modem, a vehicle-mounted device, a wearable device, a terminal device in a future 5G network (5th-Generation, "5G" for short), a terminal device in a future evolved public land mobile network ("PLMN" for short), or the like.

Figure 1:
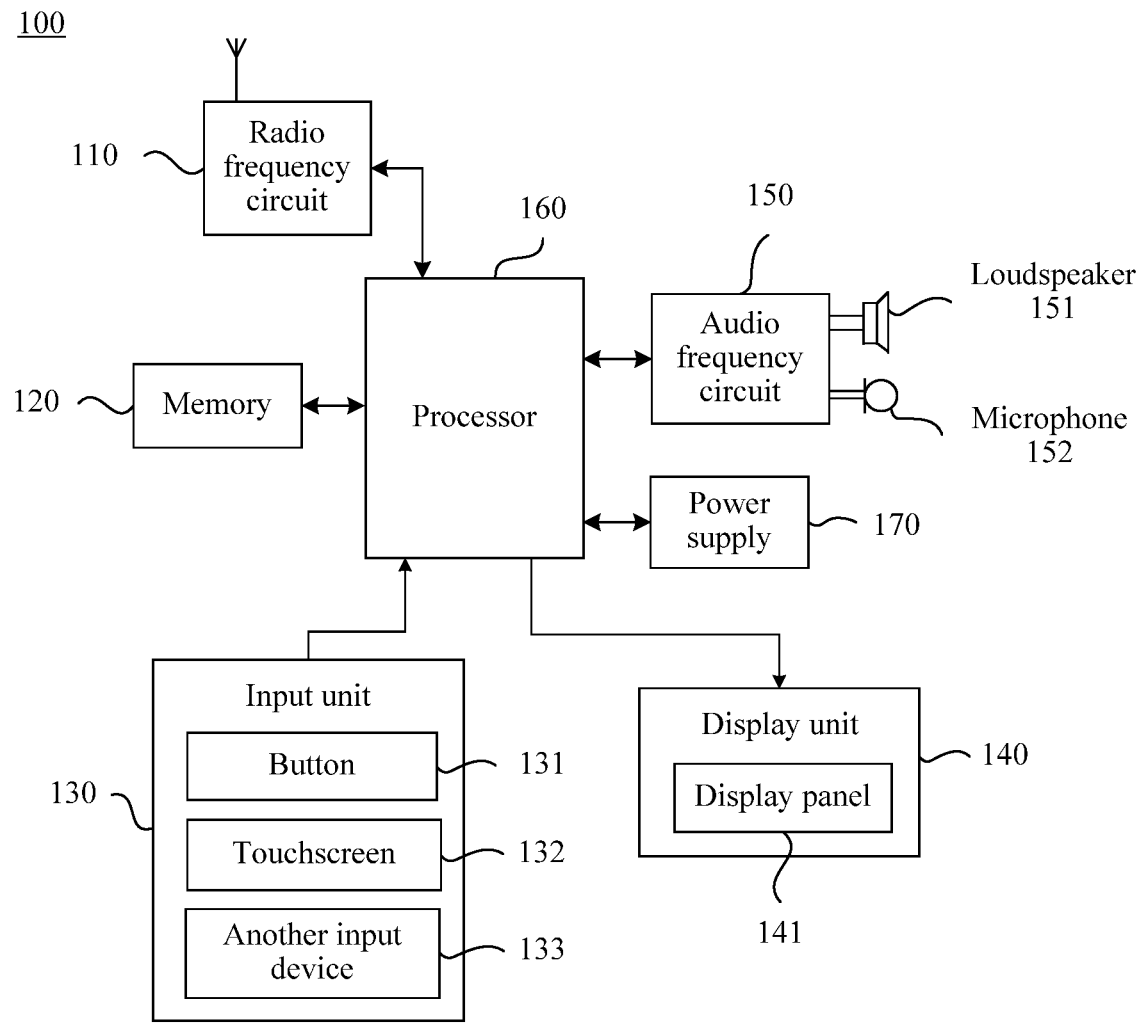
FIG. 1 is a schematic structural diagram of a terminal device that can be applied to an embodiment of this application.

FIG. 1 is a schematic structural diagram of a terminal device 100 that can be applied to an embodiment of this application.

As shown in FIG. 1, the terminal device 100 includes components such as a radio frequency ("RF" for short) circuit no, a memory 120, an input unit 140, a display unit 140, an audio frequency circuit 150, a processor 160, and a power supply 170. A person skilled in the art may understand that the structure of the terminal device 100 shown in FIG. 1 constitutes no limitation on a mobile phone, and may include more or fewer parts than those shown in the diagram, or combine some parts, or have different part arrangements.

The following specifically describes each constituent component of the terminal device 100 with reference to FIG. 1.

The RF circuit 110 may be configured to receive and send information, or receive and send a signal during a call. In particular, after receiving downlink information from a base station, the RF circuit 110 sends the downlink information to the processor 160 for processing. In addition, the RF circuit 110 sends uplink data to the base station. Generally, the RF circuit includes but is not limited to an antenna, at least one amplifier, a transceiver, a coupler, a low noise amplifier ("LNA" for short), a duplexer, and the like. In addition, the RF circuit 110 may further communicate with a network and another device through wireless communication. The wireless communication may use any communications standard or protocol, including but not limited to a Global System for Mobile Communications ("GSM" for short), a general packet radio service ("GPRS" for short), Code Division Multiple Access ("CDMA" for short), Wideband Code Division Multiple Access ("WCDMA" for short), Long Term Evolution ("LTE" for short), an email, a short message service ("SMS" for short), and the like.

The memory 120 may be configured to store a software program and a module, and the processor 160 executes various functional applications of the terminal device 100 and performs data processing by running the software program and the module stored in the memory 120. The memory 160 may mainly include a program storage area and a data storage area. The program storage area may store an operating system, an application program required by at least one function (such as an audio play function or an image play function), and the like, and the data storage area may store data (such as audio data, image data, or a phonebook) created based on use of the terminal device 100, and the like. In addition, the memory 120 may include a high-speed random access memory, or may include a non-volatile memory, such as at least one magnetic disk storage device, a flash storage device, or another volatile solid-state storage device.

The input unit 130 may be configured to: receive entered digital or character information, and generate key signal input related to user setting and function control of the terminal device 100. Specifically, the input unit 130 may include a button 131, a touchscreen 132, and another input device 133. The button 131 may sense a press operation performed on the button 131 by a user, and drive a corresponding connection apparatus based on a preset program. Optionally, the button includes a power button, a volume control button, a home button, and a shortcut button. The touchscreen 132 is also referred to as a touch panel and may collect a touch operation performed by the user on or near the touchscreen, such as an operation performed by the user on the touchscreen 132 or near the touchscreen 132 by using any proper object or accessory, such as a finger or a stylus, and drive a corresponding connection apparatus based on a preset program. Optionally, the touchscreen 132 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates, and sends the touch point coordinates to the processor 160, and can receive and execute a command sent by the processor 160. In addition, the touchscreen 132 may be implemented by using a plurality of types such as a resistive type, a capacitive type, an infrared ray, and a surface acoustic wave. The input unit 130 may include the another input device 133 in addition to the button 131 and the touchscreen 132. Specifically, the another input device 133 may include but is not limited to one or more of a physical keyboard, a trackball, a mouse, or a joystick.

The display unit 140 may be configured to display information entered by the user or information provided for the user, and various menus of the terminal device 100. The display unit 140 may include a display panel 141. Optionally, the display panel 141 may be configured in a form such as a liquid crystal display ("LCD" for short) or an organic light-emitting diode ("OLED" for short). When detecting a press operation, the button 131 may transmit the press operation to the processor 160, to determine a type of a press event, and then the processor 160 provides corresponding visual output on the display panel 141 based on the type of the press event. Further, the touchscreen 132 may cover the display panel 141. After detecting a touch operation on or near the touchscreen 132, the touchscreen 132 transmits the touch operation to the processor 160 to determine a type of a touch event, and then the processor 160 provides corresponding visual output on the display panel 141 based on the type of the touch event. In FIG. 1, the touchscreen 132 and the display panel 141 are used as two independent parts to implement input and input functions of the terminal device 100. However, in some embodiments, the touchscreen 132 and the display panel 141 may be integrated to implement the input and output functions of the terminal device 100.

The audio frequency circuit 150, a loudspeaker 151, and a microphone 152 may provide an audio interface between the user and the terminal device 100. The audio frequency circuit 150 may convert received audio data into an electrical signal, and transmit the electrical signal to the loudspeaker 151, and the loudspeaker 151 converts the electrical signal into a voice signal for output. In addition, the microphone 152 converts a collected voice signal into an electrical signal, and the audio frequency circuit 150 receives the electrical signal, converts the electrical signal into audio data, and outputs the audio data to the RF circuit 110, to send the audio data to, for example, another terminal device, or output the audio data to the memory 120 for further processing.

The processor 160 is a control center of the terminal device 100, and connects to various parts of the terminal device by using various interfaces and lines. The processor 160 performs various functions of the terminal device 100 and data processing by running or executing a software program and/or a module stored in the memory 120 and by invoking data stored in the memory 120, to perform overall monitoring on the terminal device 100. Optionally, the processor 160 may include one or more processing units. Preferably, an application processor and a modem processor may be integrated into the processor 160. The application processor mainly processes an operating system, a user interface, an application program, and the like. The modem processor mainly processes wireless communication. It may be understood that the modem processor may not be integrated into the processor 160.

The terminal device 100 further includes the power supply 170 (such as a battery) that supplies power to each part. Preferably, the power supply may be logically connected to the processor 160 by using a power supply management system, so as to implement functions such as charging management, discharging management, and power consumption management by using the power supply management system.

Although not shown, the terminal device 100 may further include a Wireless Fidelity ("WiFi" for short) module, a Bluetooth module, and the like, and an optical sensor, a gyroscope, a barometer, a hygrometer, a thermometer, an infrared sensor, and the like may be configured on the terminal device 100. Details are not described herein.

Figure 2:
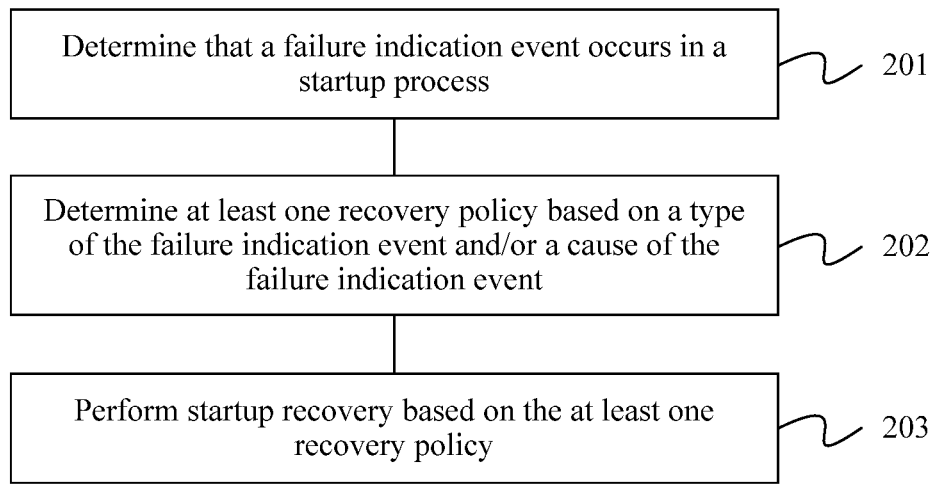
FIG. 2 is a schematic flowchart of a recovery method for a terminal device startup failure according to an embodiment of this application.

FIG. 2 is a schematic flowchart of a recovery method 200 for a terminal device startup failure according to an embodiment of this application. The method 200 may be executed by a terminal device, for example, the terminal device 100 shown in FIG. 1. Certainly, the method 200 may be executed by another terminal device. This is not specifically limited in this embodiment of this application.

In step 201, the terminal device determines that a failure indication event occurs in a startup process, where the failure indication event is used to indicate a startup failure.

In an implementation, when a preset fault occurs in the startup process, the terminal device may determine that the failure indication event occurs in the startup process.

Optionally, the preset fault may cause a startup failure, that is, a startup failure may not have occurred when the preset fault occurs.

Optionally, the preset fault may include: boot of system kernel image check fails, a system kernel image partition is damaged, boot of a core service fails, a data partition is damaged, a data partition is read-only, and a data partition is full. It should be understood that the preset fault includes not only the foregoing faults, but also another fault. This is not limited in this embodiment of this application.

For example, after a user presses a power button or a combination of buttons to start the terminal device, it is detected that a data partition is damaged in a startup process. Because the data partition damage may cause a startup failure, it may be considered that a startup failure occurs on the terminal device.

For another example, after the user presses the power button or the combination of buttons to start the terminal device, before startup of the terminal device succeeds, when repeated restarts and repeated startup image playbacks occur, the terminal device may determine that a preset fault occurs. The preset fault is the repeated restarts and the repeated startup image playbacks, and it may be determined that a startup failure occurs.

In another implementation of this embodiment of this application, when a startup timeout occurs in the startup process, the terminal device may determine that the failure indication event occurs in the startup process.

Specifically, a timer is started during startup. If no startup success event occurs within a preset startup time, the terminal device may determine that the failure indication event occurs in the startup process.

For example, the preset startup time is three minutes. When the user presses the power button or the combination of buttons to start the terminal device, the timer is started, and timing duration is three minutes. If startup of the terminal device does not succeed before the timer expires, it may be determined that startup fails.

Optionally, a time required for each stage of the startup process is learned. In this case, when a time required for a startup stage exceeds preset duration, the terminal device may determine that the failure indication event occurs in the startup process.

For example, if the terminal device learns that 20 seconds are required for a platform boot loading stage, the timer is started when this startup stage starts, and timing duration is 20 seconds. If a next startup stage does not start before the timer expires, it may be determined that startup fails.

Optionally, time periods required for some startup stages in the startup process are learned, and time periods required for other startup stages are not learned. In this case, when total duration required for the known startup stages exceeds the preset duration, the terminal device may determine that the failure indication event occurs in the startup process.

For example, the terminal device learns that 20 seconds and 25 seconds are required for a platform boot loading stage and a core service boot stage respectively, and a time required for an operating system kernel boot stage is not learned. In this case, the timer is started when the platform boot loading stage starts, and timing duration is 45 seconds; the timer is frozen when the operating system kernel boot stage starts; and the timer continues timing when the core service boot stage starts. If startup of the terminal device does not succeed before the timer expires, it may be determined that startup fails.

In another implementation of this embodiment of this application, when a user force restart occurs in the startup process, the terminal device may determine that the failure indication event occurs in the startup process.

Specifically, when the user force restart occurs in the startup process, the terminal device records that a current restart type is the user force restart. After a restart, the terminal device determines, based on the recorded restart type, that the user force restart occurs.

Optionally, the user force restart may include: a user touches and holds a power button, a user presses a preset combination of buttons, and a user pulls out a battery. It should be understood that the user force restart includes not only the foregoing manners, but also another manner. For example, a user presses a reset button. This is not limited in this embodiment of this application.

Optionally, the terminal device may record a restart type by using a hardware register, to ensure that the restart type can still be read after a restart.

For example, after the user presses the power button or the combination of buttons to start the terminal device, and before startup succeeds, the terminal device detects that the user touches and holds the power button for restart, and can save a restart type as a user force restart by using the register. During a restart, the terminal device may read the restart type stored in the register, and determine that the user force restart occurs, and may determine that a startup failure occurs.

It should be understood that the terminal device may store the restart type in another alternative manner. For example, the terminal device stores the restart type by using a non-volatile memory, provided that the restart type can be obtained after a restart. This is not limited in this embodiment of this application.

In another implementation of this embodiment of this application, when a system crash restart occurs in the startup process, the terminal device may determine that the failure indication event occurs in the startup process.

Optionally, when the system crash restart occurs in the startup process, the terminal device records that a current restart type is the system crash restart. After a restart, the terminal device determines, based on the recorded restart type, that the system crash restart occurs.

Optionally, the failure indication event may occur when a startup failure has occurred or when no startup failure has occurred.

In step 202, the terminal device determines at least one recovery policy based on a type of the failure indication event and/or a cause of the failure indication event.

Optionally, in this embodiment of this application, before the terminal device determines the at least one recovery policy based on the type of the failure indication event and/or the cause of the failure indication event, the terminal device needs to determine the type of the failure indication event and/or the cause of the failure indication event.

In an implementation, the terminal device may determine the type of the failure indication event.

Specifically, when a preset fault occurs, the terminal device may determine that the type of the failure indication event is the preset fault; when a startup timeout occurs, the terminal device may determine that the type of the failure indication event is the startup timeout; when a user force restart occurs, the terminal device may determine that the type of the failure indication event is the user force restart; or when a system crash restart occurs, the terminal device may determine that the type of the failure indication event is the system crash restart.

Optionally, the type of the failure indication event includes at least one of the preset fault, the startup timeout, the user force restart, or the system crash restart.

In another implementation, the terminal device may determine the cause of the failure indication event.

Optionally, when a system crash restart occurs, the terminal device may determine a cause of the system crash restart.

Specifically, when a system crash restart occurs, a system records a crash cause, and the terminal device may determine the crash cause based on the record.

For example, the system records a startup process. After a system crash restart occurs, the terminal device may determine, based on the record of the system, that a crash cause is a null pointer.

In another implementation, the terminal device may determine the type of the failure indication event, and then determine the cause of the failure indication event of this type.

Optionally, when a system crash restart occurs, the terminal device may determine that the type of the failure indication event is the system crash restart, and the terminal device determines a cause of the failure indication event of this type.

Optionally, in this embodiment of this application, the at least one recovery policy is at least one recovery policy selected from the following recovery policies: a system or service restart, backup system enabling, safe recovery for user data, a factory reset, and an online system update. The following describes an application scope of each strategy.

System or service restart: In this recovery policy, an entire system restart or a restart of a failed service is initiated, and it is determined whether normal startup of the terminal device is implemented after a restart. This is effective for a probabilistic startup failure, and does not damage any data.

Backup system enabling: When a partition image is damaged or a subsystem is damaged, or the subsystem has a backup system or the image has a backup image, the backup system or the backup image is used for recovery.

Safe recovery for user data: When a system data area is damaged or a key system file is damaged, the system data area can be effectively recovered by using this recovery policy, and user data is not damaged while the startup failure is resolved.

Factory reset: When both a system data area and a user data area are damaged, a factory reset operation provided by a manufacturer is performed, to restore a system to an original state. In this case, user data is lost, such as user privacy data, a third-party application installed by a user, and related application data.

Online system update: When one or more system images are damaged, and a startup failure is caused, an online system update is performed after a connection to a network, to replace a damaged image with a latest image.

It can be learned from the foregoing description that the foregoing strategies are ranked in ascending order of recovery strength. For example, from a perspective of a damage to the user data, the first three recovery policies have no damage to the user data, but the last two recovery policies may cause loss of the user data.

Optionally, in this embodiment of this application, the terminal device may determine, based on the type of the failure indication event and/or the cause of the failure indication event, the at least one recovery policy corresponding to the type of the failure indication event or the cause of the failure indication event.

For example, when the type of the failure indication event is a preset fault, and the preset fault is that boot of system kernel image check fails, the terminal device may determine that the at least one recovery policy corresponding to the system kernel image check boot failure is an online system update.

For another example, when the type of the failure indication event is a startup timeout, the terminal device may determine that the at least one recovery policy is a system or service restart, backup system enabling, safe recovery for user data, a factory reset, and an online system update.

For another example, when the type of the failure indication event is a system crash restart, the terminal device may determine that the at least one recovery policy is safe recovery for user data, a factory reset, and an online system update.

For another example, when the type of the failure event is a system crash restart, and a cause of the failure indication event of this type is a null pointer, the terminal device may determine that the at least one recovery policy is an online system update.

Optionally, there is a direct mapping relationship between the type of the failure indication event and/or the cause of the failure indication event and the at least one recovery policy, and the at least one recovery policy corresponding to the type of the failure indication event or the cause of the failure indication event may be determined based on the type of the failure indication event or the cause of the failure indication event and the mapping relationship.

Optionally, the mapping relationship may be embodied by using a mapping list.

Optionally, a first column of the mapping list may be the type of the failure indication event and/or the cause of the failure indication event, and a second column of the mapping list may be the at least one corresponding recovery policy.

For example, the terminal device stores a mapping list. When it is determined that the type of the failure indication event is a startup timeout, the terminal device may determine, in the list, a row corresponding to the startup timeout, and determine that at least one corresponding policy is at least one recovery policy shown in a second column of the row.

It should be understood that in this embodiment of this application, that there is a direct mapping relationship between the type of the failure indication event and/or the cause of the failure indication event and the at least one recovery policy is merely used as an example for description, but this embodiment of this application is not limited thereto. The at least one recovery policy corresponding to the type of the failure indication event or the cause of the failure indication event may be determined in another indirect mapping manner.

Optionally, in this embodiment of this application, the terminal device may further determine a startup stage at which the failure indication event occurs.

Optionally, the startup stage may include a platform boot loading stage, an operating system kernel boot stage, a core service boot stage, and an application stage, and the terminal device successively undergoes the four startup stages in a startup process.

The terminal device initializes a hardware platform device at the platform boot loading stage, loads a partition, and makes some preparations for starting an operating system. The terminal device needs to create and start some core services at the core service boot stage, to form an application running environment. The application stage starts when a first application program starts.

Optionally, when a user force restart or a system crash restart occurs, the terminal device may record a startup stage at which the user force restart or the system crash restart occurs. After a restart, the terminal device determines the startup stage based on the record.

Optionally, the terminal device may record, by using a nonvolatile memory, a startup stage at which the terminal device restarts.

It should be understood that the terminal device may store, in another alternative manner, the startup stage at which the failure indication event occurs, provided that the terminal device can obtain the startup stage after a restart. This is not limited in this embodiment of this application.

It should be further understood that, in this embodiment of this application, that the startup process includes the foregoing four stages is merely used as an example for description, but the terminal device does not need to include all the stages. For example, systems of some terminal devices may include only a platform boot loading stage and an application stage. In a startup process design, a designer may define startup stages based on startup processes of different terminal devices.

Optionally, when the first application program starts and/or a startup animation exits, the terminal device may determine that startup succeeds. The startup animation exits when the first application program starts or after the first application program starts.

Optionally, in this embodiment of this application, after the terminal device determines the startup stage at which the failure indication event occurs, the terminal device may determine the at least one recovery policy based on the type of the failure indication event and the startup stage at which the failure indication event occurs or based on the cause of the failure indication event and the startup stage at which the failure indication event occurs.

Because a same failure indication event may occur in different startup stages, and at least one corresponding recovery policy varies in different startup stages, the at least one recovery policy needs to be determined based on the startup stages.

For example, when the type of the failure indication event is a preset fault, and the preset fault is that boot of system kernel image check fails, if the failure indication event occurs in a platform boot loading stage, and a corresponding recovery policy is an online system update, an image related to the platform boot loading stage needs to be downloaded. If the failure indication event occurs in an operating system kernel boot stage, and a corresponding recovery policy is an online system update, an image related to the operating system kernel boot stage needs to be downloaded.

Optionally, in this embodiment of this application, the terminal device may save a mapping relationship between the at least one corresponding recovery policy and each of the type of the failure indication event and/or the cause of the failure indication event, the startup stage at which the failure indication event occurs, and a quantity of current recovery times. In this case, the terminal device may determine the at least one recovery policy based on the type of the failure indication event and/or the cause of the failure indication event, the startup stage, the quantity of current recovery times, and the mapping relationship.

For example, the mapping relationship between the at least one corresponding recovery policy and each of the type of the failure indication event or the cause of the failure indication event, the startup stage, and the quantity of current recovery times may be shown in Table 1. When a type of a failure indication event occurring at a core service boot stage is a preset fault, and the preset fault is that a data partition is damaged, it may be determined that at least one corresponding recovery policy is a system or service restart, safe recovery for user data, a factory reset, and an online system update. During first recovery, a quantity of times of performed recovery is 0, and a corresponding recovery policy is a system or service restart; when the first recovery fails, a quantity of times of performed recovery is 1, and a corresponding recovery policy is safe recovery for user data, and so on.

TABLE 1

| Type or cause | Startup stage | Quantity of times of performed recovery | Recovery policy |
| --- | --- | --- | --- |
| Boot of system kernel image check fails | Platform boot loading stage | 0 | Online system update |
| Boot of system kernel image check fails | Operating system kernel boot stage | 0 | Online system update |
| System kernel image partition is damaged | Core service boot stage | 0 | Online system update |
| Boot of a core service fails | Core service boot stage | 0 | Safe recovery for user data |
| | | 1 | Factory reset |
| | | >=2 | Online system update |
| Data partition is damaged | Core service boot stage | 0 | System or service restart |
| | | 1 | Safe recovery for user data |
| | | 2 | Factory reset |
| | | >=3 | Online system update |
| Data partition is read-only | Core service boot stage | 0 | System or service restart |
| | | 1 | Safe recovery for user data |
| | | 2 | Factory reset |
| | | >=3 | Online system update |
| Data parathion is full | Core service boot stage | 0 | Safe recovery method for user data |
| User force restart or startup timeout | Any stage | 0 | System or service restart |
| | | 1 | Backup system enabling |
| | | 2 | Safe recovery for user data |
| | | 3 | Factory reset |
| | | 4 | Online system update |

It should be understood that, in this embodiment of this application, the mapping table shown in Table 1 is merely used as an example for description, but this embodiment of this application is not limited thereto. A designer for the startup process may determine, based on experience, the mapping relationship between the at least one corresponding recovery policy and each of the type of the failure indication event or the cause of the failure indication event, the startup stage, and the quantity of current recovery times, and set a corresponding mapping table.

Optionally, in this embodiment of this application, a maximum quantity of recovery times may be preset, and when a quantity of times of performed recovery is greater than or equal to the maximum quantity of recovery times, no recovery policy is executed.

For example, as shown in Table 1, if the maximum quantity of recovery times is 3, the type of the failure indication event occurring in the core service boot stage is a preset fault, and the preset fault is that the data partition is read-only, it may be determined that at least one corresponding recovery policy is the system or service restart, the safe recovery for user data, the factory reset, and the online system update. When recovery does not succeed by performing the system or service restart, the safe recovery for user data, and the factory reset, if a quantity of times of performed recovery is equal to the maximum quantity of recovery times, the online system update is no longer performed for recovery, and it is determined that recovery fails.

In step 203, the terminal device performs startup recovery based on the at least one recovery policy.

Optionally, in this embodiment of this application, the terminal device performs startup recovery based on a preset execution sequence of the at least one recovery policy, until a first application program starts or all recovery policies in the at least one recovery policy fail in recovery.

For example, as shown in Table 1, when the type of the failure indication event is the preset fault, and the preset fault is that the boot of system kernel image check fails or the system kernel image partition is damaged, the terminal device may determine that the recovery policy corresponding to the core service boot failure is the online system update, and the terminal device directly performs the online system update.

For another example, when the type of the failure indication event is the preset fault, and the preset fault is that the boot of a core service fails, the terminal device may determine that the at least one recovery policy corresponding to the core service boot failure is successively the safe recovery for user data, the factory reset, and the online system update based on the preset execution sequence. The terminal device first performs the safe recovery for user data, and when recovery does not succeed by performing the safe recovery for user data, the terminal device performs the factory reset. When recovery does not succeed by performing the factory reset, the terminal device performs the online system update.

For another example, when the type of the failure indication event is the preset fault, and the preset fault is that the data partition is damaged or the data partition is read-only, the terminal device may determine that the at least one recovery policy corresponding to the core service boot failure is successively the system or service restart, the safe recovery for user data, the factory reset, and the online system update based on the preset execution sequence. The terminal device first performs the system or service restart, and when recovery does not succeed by performing the system or service restart, the terminal device performs the safe recovery for user data. When recovery succeeds by performing the safe recovery for user data, the terminal device no longer executes a next recovery policy.

For another example, when the type of the failure indication event is the startup timeout or the user force restart, the terminal device may determine that the at least one recovery policy corresponding to the core service boot failure is successively the system or service restart, the backup system enabling, the safe recovery for user data, the factory reset, and the online system update based on the preset execution sequence. The terminal device first performs the system or service restart, and when recovery does not succeed by performing the system or service restart, the terminal device performs the safe recovery for user data. When recovery does not succeed by performing the safe recovery for user data, the terminal performs the factory reset. When recovery succeeds by performing the factory reset, the terminal device no longer executes a next recovery policy.

Optionally, the recovery policies may be ranked in ascending order of extents of damages to user data.

For example, when the type of the failure indication event is the preset fault, and the preset fault is that the boot of a core service fails, the terminal device may determine that the at least one recovery policy corresponding to the core service boot failure is successively the safe recovery for user data, the factory reset, and the online system update based on the preset execution sequence. During first recovery, the terminal device performs the safe recovery for user data, and when recovery succeeds, the terminal device no longer executes a next recovery policy for recovery, or when recovery does not succeed by performing the safe recovery for user data, the terminal device performs second recovery, and performs the factory reset. When recovery succeeds, the terminal device no longer executes a next recovery policy for recovery; or when recovery does not succeed by performing the factory reset, the terminal device performs third recovery, and performs the online system update. When recovery succeeds, the terminal device no longer executes a next recovery policy for recovery; or when recovery fails, startup of the terminal device fails.

Optionally, in this embodiment of this application, the terminal device may randomly select a recovery policy from the at least one recovery policy to perform recovery.

Optionally, in this embodiment of this application, the terminal device may select a recovery policy with a highest recovery success rate from the at least one recovery policy to perform recovery.

For example, when the type of the failure indication event is the preset fault, and the preset fault is that the data partition is damaged, the terminal device may determine that the at least one recovery policy corresponding to the data partition damage is the system or service restart, the safe recovery for user data, the factory reset, and the online system update. When determining that the factory reset has a highest recovery success rate, the terminal device directly performs the factory reset for recovery.

Optionally, the terminal device may execute, by performing subsystem recovery eRecovery, a recovery policy other than the system or service restart.

Optionally, before executing a recovery policy, the terminal device may prompt a user whether the recovery policy needs to be executed.

For example, when boot of system kernel image check fails at a platform boot loading stage or an operating system kernel boot stage, the terminal device determines that a recovery policy is an online system update. After making corresponding preparations, the terminal device enters a recovery interface, and notifies the user of the following three options: (1) Download a latest image (recommended); (2) Restart; (3) Shutdown. If the user chooses to perform a restart or a shutdown, the terminal device is restarted or is shut down, or if the user chooses to download a latest image, the terminal device starts to detect a WiFi network, and connects to an update server, to perform a standard image update process.

For another example, when boot of a core service fails at a core service boot stage, the terminal device determines that a first to-be-executed recovery policy is safe recovery for user data. After making corresponding preparations, the terminal device executes the recovery policy. After an automatic restart, if the restart succeeds, it indicates that startup recovery succeeds, or if startup of the terminal device still fails after a restart, the terminal device determines that a second to-be-executed recovery policy is a factory reset. After making corresponding preparations, the terminal device enters a recovery interface, and notifies a user of the following two options: (1) Factory reset (recommended); (2) Shutdown. If the user chooses to perform a factory reset, the terminal device performs a factory reset operation implemented by a device manufacturer, and automatically restarts after completing the operation. If startup of the terminal device still fails after a restart, the terminal device determines that a third to-be-executed recovery policy is an online system update. After making corresponding preparations, the terminal device enters the recovery interface, and notifies the user of the following two options: (i) Download a latest image (recommended); (2) Shutdown. The terminal device starts to detect a WiFi network, and connects to an update server, to perform a standard image update process. After the update, if startup of the terminal device still fails after a restart, the user is notified of a recovery failure and shuts down the terminal device.

For another example, when a startup timeout or a user force restart occurs at an unknown startup stage, the terminal device determines that a first to-be-executed recovery policy is a system or service restart, and attempts to repair a file system first. If the file system cannot be repaired, the terminal device determines that a second to-be-executed recovery policy is backup system enabling. After making corresponding preparations, the terminal device enters a recovery interface, and notifies the user of the following two options: (i) Enable a backup system (recommended); (2) Shutdown. If the user chooses to enable a backup system, the terminal device performs repair by using a backup, and restarts after the repair. If the repair fails after a restart, the terminal device determines that a third to-be-executed recovery policy is safe recovery for user data. After making corresponding preparations, the terminal device executes the recovery policy. After an automatic restart, if the restart succeeds, it indicates that startup recovery succeeds, or if startup of the terminal device still fails after a restart, the terminal device determines that a fourth to-be-executed recovery policy is a factory reset. After making corresponding preparations, the terminal device enters the recovery interface, and notifies the user of the following two options: (i) Factory reset (recommended); (2) Shutdown. If the user chooses to perform a factory reset, the terminal device performs a factory reset operation implemented by a device manufacturer, and automatically restarts after completing the operation. If startup of the terminal device still fails after a restart, the terminal device determines that a fifth to-be-executed recovery policy is an online system update. After making corresponding preparations, the terminal device enters the recovery interface, and notifies the user of the following three options: (1) Download a latest image (recommended); (2) Shutdown. The terminal device starts to detect a WiFi network, and connects to an update server, to perform a standard image update process. After the update, if startup of the terminal device still fails after a restart, the user is notified of a recovery failure and shuts down the terminal device.

Figure 3:
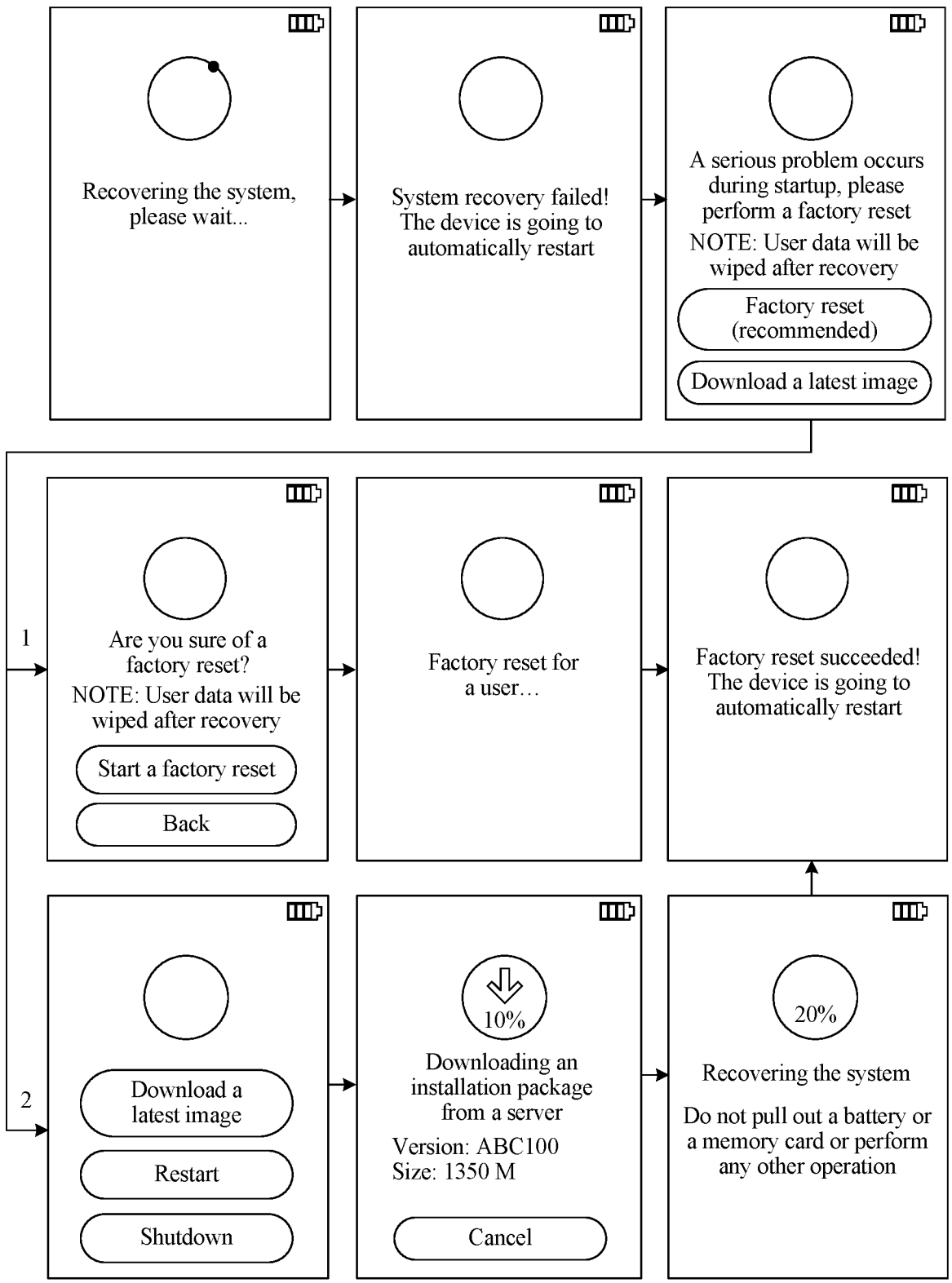
FIG. 3 is a schematic diagram of a recovery interface in a recovery process.

FIG. 3 is a schematic diagram of a recovery interface in a recovery process. As shown in FIG. 3, the terminal device first chooses to perform safe recovery for user data. After making corresponding preparations, the terminal device executes the recovery policy, and displays "Recovering the system, please wait . . . " on the recovery interface. If the recovery fails, "System recovery failed! The device is going to automatically restart" is displayed on the recovery interface. During the restart, the terminal device determines that a factory reset or an online system update needs to be performed, displays "A serious problem occurs during startup, please perform a factory reset" on the recovery interface and "NOTE: User data will be wiped after recovery" to prompt a user, and provides two options: "Factory reset (recommended)" and "Download a latest image" for the user.

When the user selects "Factory reset", the terminal device performs operations based on a sequence number 1, and displays "Are you sure of a factory reset?" on the recovery interface, and provides two options: "Start a factory reset" and "Back" for the user. When the user selects "Start a factory reset", the terminal device performs a factory reset operation implemented by a device manufacturer, and displays "Factory reset for a user" on the recovery interface. When the factory reset is completed, the terminal device displays "Factory reset succeeded! The device is going to automatically restart" on the recovery interface.

When the user selects "Download a latest image", the terminal device performs operations based on a sequence number 2, and provides three options: "Download a latest image", "Restart", and "Shutdown" on the recovery interface for the user. When the user selects "Download a latest image", the terminal device starts to detect a WiFi network, connects to an update server to download an installation package, displays "Downloading an installation package from a server" on the recovery interface, displays download progress, version information, and package size information, and provides an option "Cancel" for the user. After the installation package is downloaded, the terminal device performs a standard image update process, and displays "Recovering the system" and "Do not pull out a battery or a memory card or perform any other operation" on the recovery interface. In addition, after system recovery is completed, the terminal device displays "Factory reset succeeded! The device is going to automatically restart" on the recovery interface.

It should be understood that in this embodiment of this application, the recovery interface and the prompts shown in FIG. 3 are merely used as an example for description, but this application is not limited thereto.

In this case, the terminal device friendly interacts with the user by using the recovery interface, to guide the user to perform related authorization. In addition, some options are provided for the user, to better meet a requirement of the user.

Optionally, in this embodiment of this application, after performing startup recovery based on a first recovery policy in the at least one recovery policy, the terminal device may generate a startup log corresponding to the first recovery policy. The startup log includes at least one of the type of the failure indication event, the startup stage at which the failure indication event occurs, a fault log, the first recovery policy, and a corresponding recovery result. The first recovery policy may be any one of the at least one recovery policy.

Optionally, when the recovery fails by using the first recovery policy, the terminal device may save the startup log.

Optionally, when the recovery succeeds by using the first recovery policy, the terminal device may upload, to a log statistics and measurement system, the startup log corresponding to the first recovery policy that succeeds in recovery and a previously saved startup log corresponding to a recovery policy that is in the at least one recovery policy and that fails in recovery.

Optionally, the terminal device may save the startup log to a nonvolatile memory, so that the terminal device can still obtain the startup log in a re-startup process.

Optionally, when a quantity of saved startup logs is greater than or equal to a maximum quantity of logs, the terminal device may delete a startup log that has been stored for the longest time.

Optionally, the log statistics and measurement system may determine, based on a received startup log, at least one of a startup failure ratio, a startup failure type or cause ratio, a recovery effective ratio, or a recovery policy effective ratio.

The startup failure ratio is a ratio of a total quantity of startup failures to a total quantity of startup times. The startup failure type or cause ratio is a ratio of a quantity of occurring times of the type and the cause to the total quantity of startup failures. The recovery effective ratio is a ratio of a total quantity of recovery successes to a total quantity of recovery times. The recovery policy effective ratio is a ratio of a quantity of times of using the recovery policy for successful recovery to a total quantity of times of using the recovery policy for recovery.

In this case, an administrator or a designer may improve the startup process of the terminal device based on statistical data in the log statistics and measurement system.

In this embodiment of this application, the terminal device may determine the at least one recovery policy based on the type of the failure indication event or the cause of the failure indication event, and can select proper startup recovery policies for different startup failure cases, instead of performing recovery only in a restart manner. This further improves a success rate of startup recovery.

In addition, an automatic startup recovery process can be performed, and a user does not need to enter a security mode manually. This improves user experience.

Optionally, in this embodiment of this application, in an automatic restart process after each time the terminal device executes a recovery policy, the terminal device may determine a failure indication event occurred in this restart process. The failure indication event may be different from a failure indication event in a last startup or restart process. The terminal device may determine at least one recovery policy based on a type of the failure indication event or a cause of the failure indication event in this restart process.

For example, when a type of a failure indication event occurred in a startup process in which the user presses the power button or the combination of buttons to start the terminal device is a data partition damage, the terminal device may first perform a system or service restart. When a type of a failure indication event occurred in a restart process is still the data partition damage, the terminal device determines that safe recovery for user data may be performed for recovery. When a type of a failure indication event occurred in a restart process after recovery changes to a core service boot failure, the terminal device learns that the system or service restart and the safe recovery for user data have been previously performed, and determines to perform a factory reset. When recovery succeeds by performing the factory reset, the terminal device no longer executes another recovery policy.

The recovery method for a terminal device startup failure provided in the embodiments of this application is described above in detail with reference to FIG. 2 and FIG. 3. With reference to FIG. 4 to FIG. 8, the following describes a terminal device and a terminal device startup detection and recovery system in the embodiments of this application.

Figure 4:
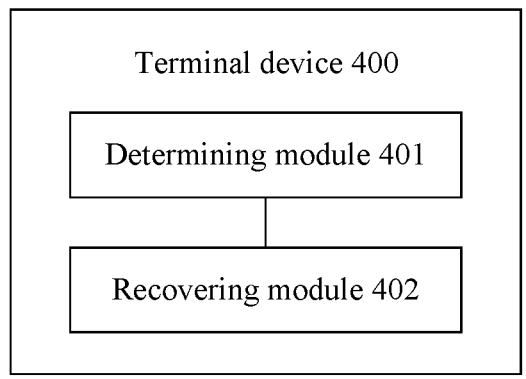
FIG. 4 is a schematic block diagram of a terminal device according to an embodiment of this application.

FIG. 4 is a schematic block diagram of a terminal device 400 according to an embodiment of this application. As shown in FIG. 4, the terminal device includes: a determining module 401, configured to determine that a failure indication event occurs in a startup process, where the failure indication event is used to indicate a startup failure; where the determining module 401 is further configured to determine at least one recovery policy based on a type of the failure indication event and/or a cause of the failure indication event; and a recovering module 402, configured to perform startup recovery based on the at least one recovery policy.

In this embodiment of this application, the terminal device may determine the at least one recovery policy based on the type of the failure indication event or the cause of the failure indication event, and can select proper startup recovery policies for different startup failure cases, instead of performing recovery only in a restart manner. This further improves a success rate of startup recovery.

In addition, an automatic startup recovery process can be performed, and a user does not need to enter a security mode manually. This improves user experience.

Optionally, in this embodiment of this application, the determining module 401 is specifically configured to determine, based on the type of the failure indication event and/or the cause of the failure indication event, the at least one recovery policy corresponding to the type of the failure indication event and/or the cause of the failure indication event.

Optionally, in this embodiment of this application, the type of the failure indication event includes at least one of a preset fault, a startup timeout, a user force restart, and a system crash restart.

Optionally, in this embodiment of this application, the user force restart includes touching and holding a power button, pressing a preset combination of buttons, and pulling out a battery.

Optionally, in this embodiment of this application, the determining module 401 is specifically configured to: when the failure indication event is the system crash restart, determine the at least one recovery policy based on a crash cause of the system crash restart.

Optionally, in this embodiment of this application, the determining module 401 is further configured to: determine a startup stage at which the failure indication event occurs, and determine the at least one recovery policy based on the type of the failure indication event and the startup stage or based on the cause of the failure indication event and the startup stage.

Optionally, in this embodiment of this application, the recovering module 402 is specifically configured to perform startup recovery based on a preset execution sequence of the at least one recovery policy, until a first application program starts or all recovery policies in the at least one recovery policy fail in recovery.

Figure 5:
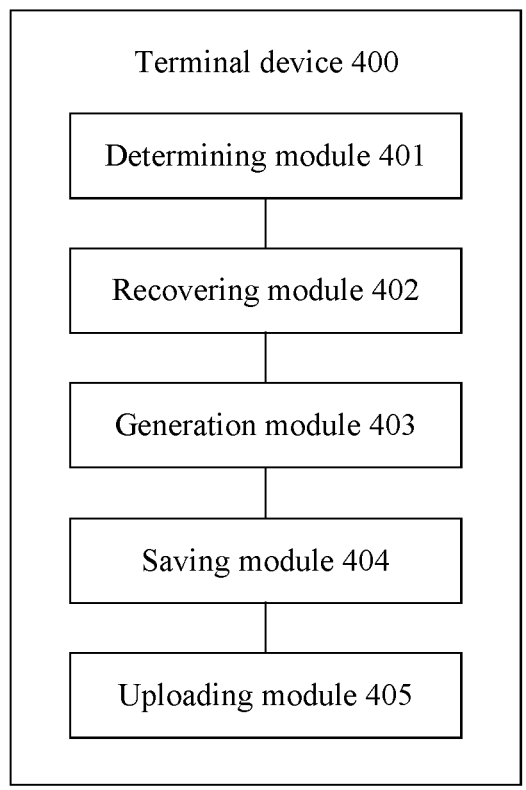
FIG. 5 is a schematic block diagram of a terminal device according to an embodiment of this application.

Optionally, in this embodiment of this application, as shown in FIG. 5, the terminal device 400 further includes: a generation module 403, configured to: after startup recovery is performed based on a first recovery policy in the at least one recovery policy, generate a startup log corresponding to the first recovery policy, where the startup log includes at least one of the type of the failure indication event, the startup stage at which the failure indication event occurs, a fault log, the first recovery policy, and a corresponding recovery result; a saving module 404, configured to: when the recovery fails, save the startup log; and an uploading module 405, configured to: when the recovery succeeds, upload, to a log statistics and measurement system, the startup log and a saved startup log of a recovery policy that is in the at least one recovery policy and that fails in recovery.

Optionally, in this embodiment of this application, the at least one recovery policy is at least one recovery policy selected from the following recovery policies: a system or service restart, backup system enabling, safe recovery for user data, a factory reset, and an online system update.

Optionally, in this embodiment of this application, if the type of the failure indication event is the preset fault, and the preset fault is that boot of system kernel image check fails or a system kernel image partition is damaged, the at least one recovery policy is the online system update.

Optionally, in this embodiment of this application, if the type of the failure indication event is the preset fault, and the preset fault is that boot of a core service fails, based on the preset execution sequence, the at least one recovery policy is successively: the safe recovery for user data, the factory reset, and the online system update.

Optionally, in this embodiment of this application, if the type of the failure indication event is the preset fault, and the preset fault is that a data partition is damaged or a data partition is read-only, based on the preset execution sequence, the at least one recovery policy is successively: the system or service restart, the safe recovery for user data, the factory reset, and the online system update.

Optionally, in this embodiment of this application, if the type of the failure indication event is the startup timeout or the user force restart, based on the preset execution sequence, the at least one recovery policy is successively: the system or service restart, the backup system enabling, the safe recovery for user data, the factory reset, and the online system update.

It should be understood that the foregoing and other operations and/or functions of the modules of the terminal device 400 in this embodiment of this application are separately used to implement corresponding procedures of the method in FIG. 2. For brevity, details are not described herein again.

Figure 6:
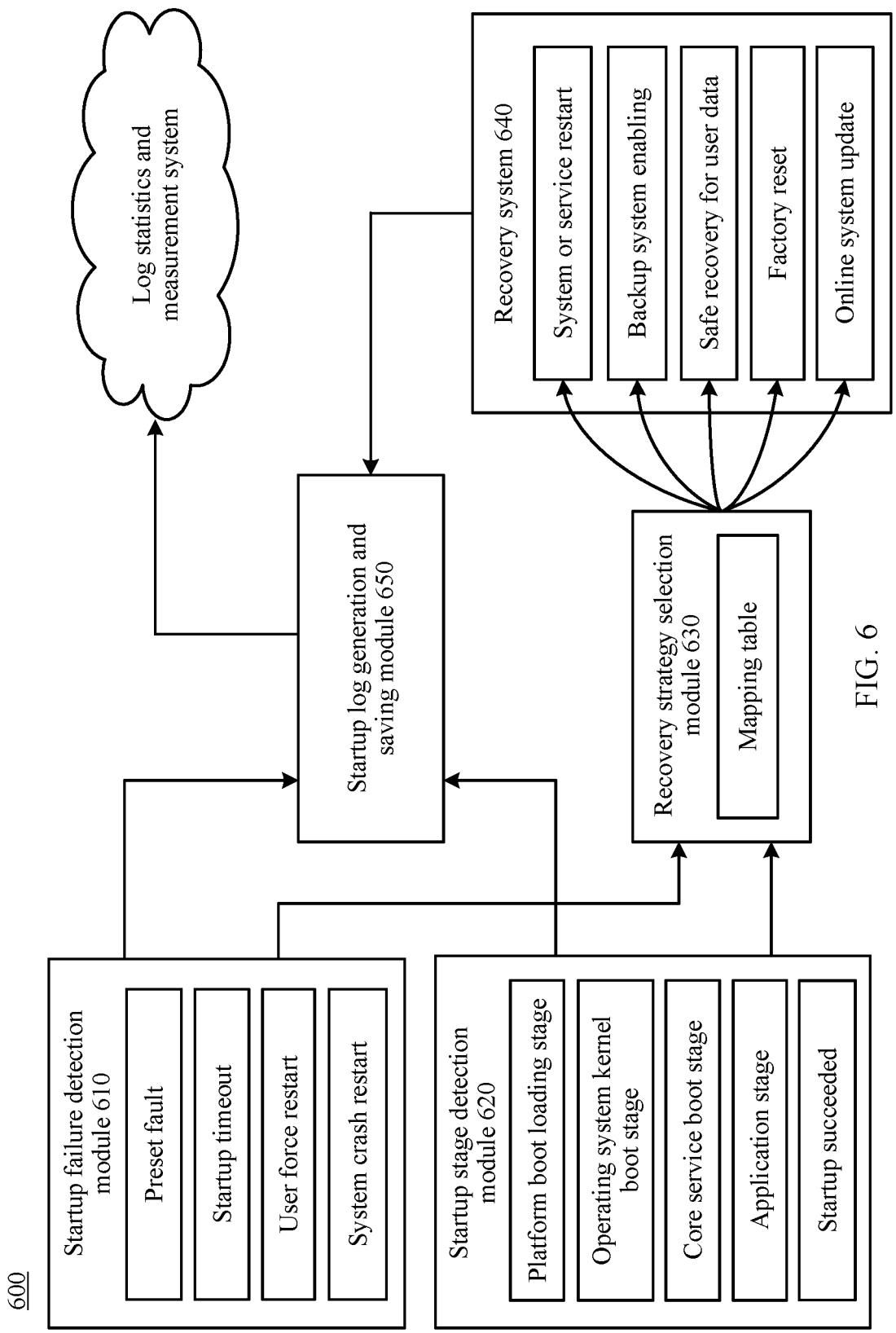
FIG. 6 is a schematic block diagram of a terminal device startup detection and recovery system according to an embodiment of this application.

FIG. 6 is a schematic block diagram of a terminal device startup detection and recovery system 600 according to an embodiment of this application. As shown in FIG. 6, the terminal device startup detection and recovery system 600 includes a startup failure detection module 610, a startup stage detection module 620, a recovery policy selection module 630, a recovery system 640, and a startup log generation and saving module 650.

The startup failure detection module 610 may be configured to: determine that a failure indication event occurs in a startup process, and determine a type of the failure indication event and/or a cause of the failure indication event. The startup failure detection module 610 may be further configured to: after determining the type of the failure indication event and/or the cause of the failure indication event, send the type of the failure indication event and/or the cause of the failure indication event to the recovery policy selection module 630 and the startup log generation and saving module 650.

Specifically, when a preset fault occurs, the startup failure detection module 610 may determine that the type of the failure indication event is the preset fault; when a startup timeout occurs, the startup failure detection module 610 may determine that the type of the failure indication event is the startup timeout; when a user force restart occurs, the startup failure detection module 610 may determine that the type of the failure indication event is the user force restart; when a system crash restart occurs, the startup failure detection module 610 may determine that the type of the failure indication event is the system crash restart, and determine the cause of the failure indication event of this type.

The startup stage detection module 620 may be configured to: determine a startup stage at which the failure indication event occurs, and determine that startup succeeds. The startup stage detection module 620 may be further configured to send, to the recovery policy selection module 630 and the startup log generation and saving module 650, the startup stage at which the failure indication event occurs.

Specifically, the startup stage detected by the startup stage detection module 620 may include a platform boot loading stage, an operating system kernel boot stage, a core service boot stage, and an application stage. When a first application program starts and/or a startup animation exits, the startup stage detection module 620 may determine that startup succeeds. The startup animation exits when the first application program starts or after the first application program starts.

The recovery policy selection module 630 may be configured to: save a mapping table representing a mapping relationship between a recovery policy and each of a type of a failure indication event and/or a cause of the failure indication event, a startup stage at which the failure indication event occurs, and a quantity of current recovery times, and determine, based on the type that is of the failure indication event and that is sent by the startup failure detection module 610 and the startup stage at which the failure indication event occurs and that is sent by the startup stage detection module 620 or based on the cause that is of the failure indication event and that is sent by the startup failure detection module 610 and the startup stage at which the failure indication event occurs and that is sent by the startup stage detection module 620, at least one recovery policy corresponding to the type of the failure indication event or the cause of the failure indication event. The recovery policy selection module 630 may be further configured to: after determining the at least one recovery policy, instruct the recovery system 640 to perform recovery.

The recovery system 640 may be configured to successively execute recovery policies in the at least one recovery policy determined by the recovery policy selection module 630, until the first application program starts or all recovery policies in the at least one recovery policy fail in recovery. The recovery policies that can be executed by the recovery system 640 include a system or service restart, backup system enabling, safe recovery for user data, a factory reset, and an online system update. The recovery system 640 may further send an executed recovery policy and a recovery result to the startup log generation and saving module 650.

The startup log generation and saving module 650 may be configured to generate a startup log based on the type of the failure indication event or the cause of the failure indication event sent by the startup failure detection module 610, the startup stage at which the failure indication event occurs and that is sent by the startup stage detection module 620, and the executed recovery policy and the recovery result sent by the recovery system 640. The startup log generation and saving module 650 may be further configured to: when the recovery fails, save the startup log. The startup log generation and saving module 650 may be further configured to: when the recovery succeeds, upload, to a log statistics and measurement system, a startup log corresponding to the recovery policy that succeeds in recovery and a previously saved startup log corresponding to a recovery policy that is in the at least one recovery policy and that fails in recovery.

It should be understood that the foregoing and other operations and/or functions of the modules of the terminal device startup detection and recovery system 600 in this embodiment of this application are separately used to implement corresponding procedures of the method in FIG. 2. For brevity, details are not described herein again.

Figure 7:
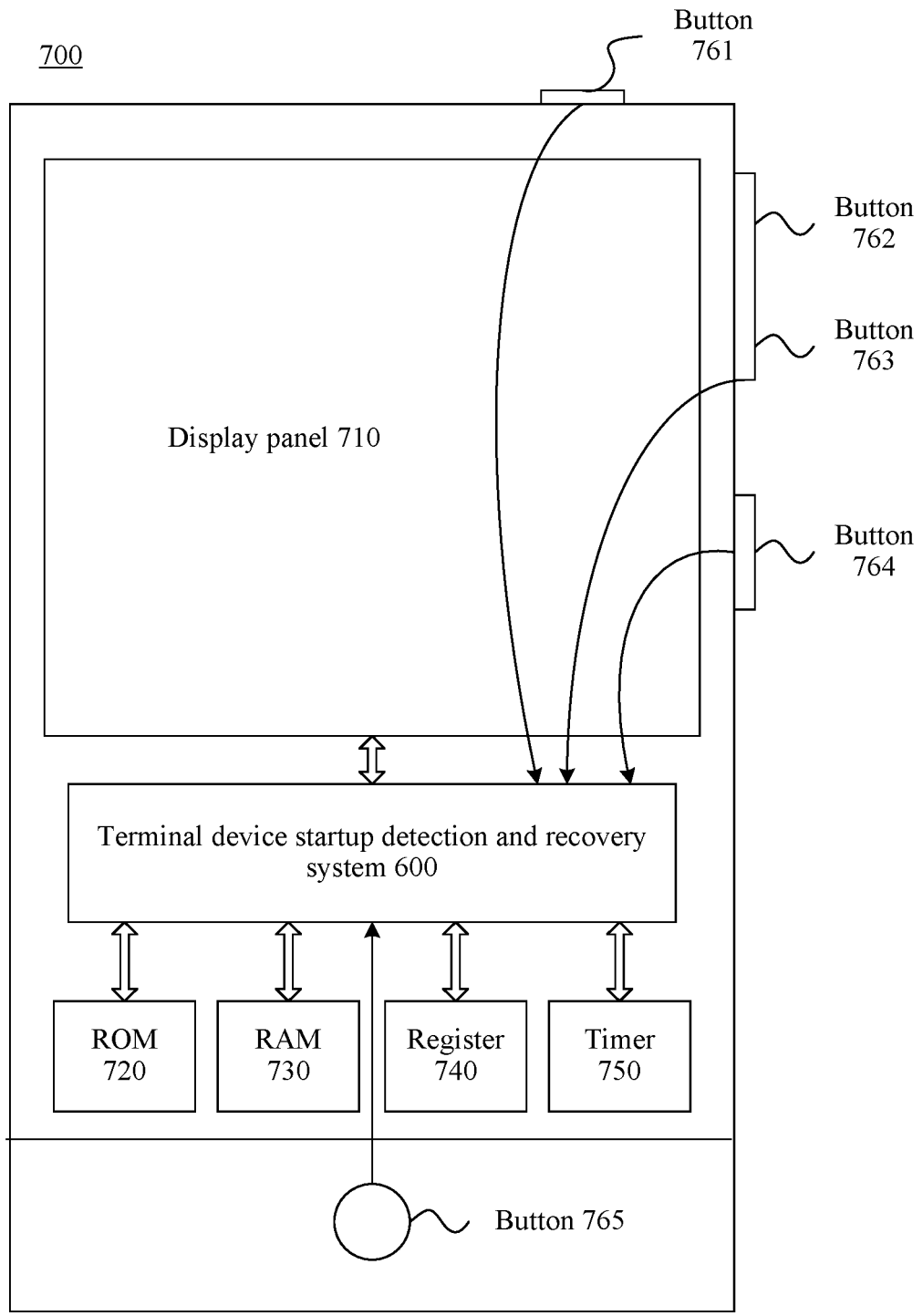
FIG. 7 is a schematic structural diagram of a terminal device according to an embodiment of this application.

FIG. 7 is a schematic structural diagram of a terminal device 700 according to an embodiment of this application. As shown in FIG. 7, the terminal device 700 includes the terminal device startup detection and recovery system 600 in the foregoing embodiment of this application, a display panel 710, a read-only memory (Read-Only Memory, "ROM" for short) 720, a random access memory (Random Access Memory, "RAM" for short) 730, a register 740, a timer 750, and buttons 761 to 765.

The terminal device startup detection and recovery system 600 may perceive press events of the buttons 761 to 765, such as a startup event or a user force restart event, and may perform a corresponding startup failure detection and recovery function.

The ROM 720 may be configured to store code that needs to be executed by the terminal device startup detection and recovery system 600. The RAM 730 is used by the terminal device startup detection and recovery system 600 to execute the code stored in the ROM 720, to implement a corresponding function. The register 740 is configured to store a restart type of the terminal device 700.

The timer 750 is used by the terminal device startup detection and recovery system 600 to detect whether a startup timeout occurs. Optionally, if the timer expires, the terminal device startup detection and recovery system 600 may be notified that a timeout occurs.

The display panel 710 is configured to display a startup status of the terminal device 700 and a case in which the terminal device startup detection and recovery system 600 performs recovery, so as to provide a friendly interaction interface for a user, and guide the user to perform related authorization.

Optionally, the display panel 710 may be covered with a touchscreen. The touchscreen may be used to perceive a touch event of the user, and control the terminal device startup detection and recovery system 600 to perform a corresponding operation, so as to provide some options for the user.

It should be understood that in this embodiment of this application, the structure of the terminal device 700 shown in FIG. 7 does not constitute a limitation to the terminal device. The terminal device 700 may further include more or fewer parts than those shown in the diagram, or may combine some parts, or may have different part arrangements.

Figure 8:
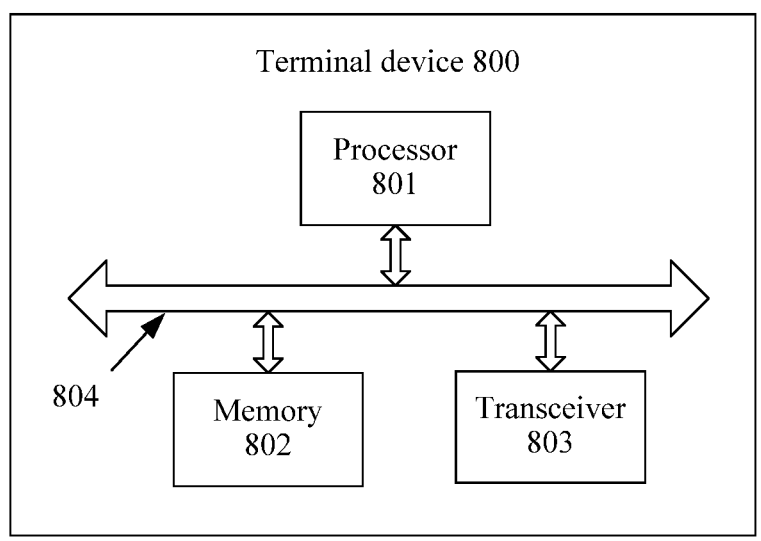
FIG. 8 is a schematic structural diagram of a terminal device according to an embodiment of this application.

FIG. 8 is a schematic structural diagram of a terminal device 800 according to an embodiment of this application. As shown in FIG. 8, the terminal device 800 includes a processor 801, a memory 802, a transceiver 803, and a bus system 804. The processor 801, the memory 802, and the transceiver 803 are connected by using the bus system 804. The memory 802 is configured to store an instruction, the transceiver 803 is configured to receive and send information, and the processor 801 is configured to execute the instruction stored in the memory 802.

The processor 801 is configured to determine that a failure indication event occurs in a startup process, where the failure indication event is used to indicate a startup failure.

The processor 801 is configured to determine at least one recovery policy based on a type of the failure indication event or a cause of the failure indication event.

The processor 801 is configured to perform startup recovery based on the at least one recovery policy.

It should be understood that, for a specific structure of the terminal device 800, refer to the terminal device 100 shown in FIG. 1. Details are not described herein again.

It should also be understood that the foregoing and other operations and/or functions of the modules of the terminal device 800 in this embodiment of this application are separately used to implement corresponding procedures of the method in FIG. 2. For brevity, details are not described herein again.

In this embodiment of this application, the processor may be a central processing unit ("CPU" for short), a network processor ("NP" for short), or a combination of the CPU and the NP. The processor may further include a hardware chip. The hardware chip may be an application-specific integrated circuit ("ASIC" for short), a programmable logic device ("PLD" for short), or a combination thereof. The PLD may be a complex programmable logical device ("CPLD" for short), a field programmable gate array ("FPGA" for short), a generic array logic ("GAL" for short), or any combination thereof.

The memory may be a volatile memory or a nonvolatile memory, or may include both the volatile memory and the nonvolatile memory. The nonvolatile memory may be a read-only memory, a programmable read-only memory ("PROM" for short), an erasable programmable read-only memory ("EPROM" for short), an electrically erasable programmable read-only memory ("EEPROM" for short), or a flash memory. The volatile memory may be a random access memory, and is used as an external cache.

The bus system may include a power bus, a control bus, a status signal bus, and the like, in addition to a data bus. For ease of denotation, the bus system is indicated by using only one bold line in the diagram. However, it does not indicate that there is only one bus or only one type of bus.

An embodiment of this application provides a computer readable medium, and the computer readable medium is configured to store a computer program. The computer program includes an instruction for performing the recovery method for a terminal device startup failure in the foregoing embodiment of this application in FIG. 2. The readable medium may be a ROM or a RAM, and this is not limited in this embodiment of this application.

It should be understood that the terms "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
    determining, by a terminal device, that a failure indication event has occurred in a startup process of the terminal device, wherein the failure indication event indicates a startup failure;

determining, by the terminal device, a recovery policy based on a type of the failure indication event or a cause of the failure indication event, and based on a current quantity of recovery times and a startup stage at which the failure indication event occurred, wherein different current quantities of recovery times correspond to different recovery policies, and failure indication events occurring at different startup stages correspond to different recovery policies; and performing, by the terminal device, startup recovery on the terminal device based on the recovery policy, wherein when the type of the failure indication event or the cause of the failure indication event and the startup stage at which the failure indication event occurred correspond to a preset execution sequence of recovery policies, a subsequent start up recovery based on a subsequent recovery policy in the preset execution sequence of recovery policies is performed only when recovery does not succeed in response to performing an earlier startup recovery based on an earlier recovery policy in the preset execution sequence of recovery policies.

2. The method according to claim 1, wherein determining the recovery policy based on the type of the failure indication event or the cause of the failure indication event, and based on the current quantity of recovery times and the startup stage at which the failure indication event occurred, comprises:

determining, based on the type of the failure indication event or the cause of the failure indication event, and based on the current quantity of recovery times and the startup stage at which the failure indication event occurred, the recovery policy corresponding to the type of the failure indication event or the cause of the failure indication event, and corresponding to the current quantity of recovery times and the startup stage at which the failure indication event occurred.

3. The method according to claim 1, wherein the type of the failure indication event comprises: a preset fault type, a startup timeout type, a user force restart type, or a system crash restart type.

4. The method according to claim 3, wherein the user force restart type corresponds to a failure indication event caused by:
touching and holding a power button;
pressing a preset combination of buttons; or
pulling out a battery.

5. The method according to claim 3, wherein the recovery policy is selected from a plurality of recovery policies stored by the terminal device, and the plurality of recovery policies comprises at least two of:
a system or service restart recovery policy, backup system enabling recovery policy, a safe recovery for user data recovery policy, a factory reset recovery policy, and an online system update recovery policy.

6. The method according to claim 5, wherein the type of the failure indication event is the preset fault type, the failure indication event of the preset fault type is generated when a boot of system kernel image check fails or a system kernel image partition is damaged, and the recovery policy is the online system update policy.

7. The method according to claim 5, wherein the type of the failure indication event is the preset fault type, and the failure indication event of the preset fault type is generated when a boot of a core service fails; and
wherein performing startup recovery on the terminal device based on the recovery policy comprises:
performing startup recovery on the terminal device based on the preset execution sequence, wherein the preset execution sequence comprises sequential execution of the safe recovery for user data policy, the factory reset recovery policy, and the online system update policy.

8. The method according to claim 5, wherein the type of the failure indication event is the preset fault type, and the failure indication event of the preset fault type is generated when a data partition is damaged or a data partition is read-only; and
wherein performing startup recovery on the terminal device based on the recovery policy comprises:
performing startup recovery on the terminal device based on the preset execution sequence, wherein the preset execution sequence comprises sequential execution of the system or service restart policy, the safe recovery for user data policy, the factory reset recovery policy, and the online system update policy.

9. The method according to claim 5, wherein the type of the failure indication event is the startup timeout type or the user force restart type; and
wherein performing startup recovery on the terminal device based on the recovery policy comprises:
performing startup recovery on the terminal device based on the preset execution sequence, wherein the preset execution sequence comprises sequential execution of: the system or service restart policy, the backup system enabling policy, the safe recovery for user data policy, the factory reset recovery policy, and the online system update policy.

10. The method according to claim 3, wherein determining the recovery policy based on the type of the failure indication event or the cause of the failure indication event, and based on the current quantity of recovery times and the startup stage at which the failure indication event occurred comprises:
when the failure indication event is the system crash restart type, determining the recovery policy based on a crash cause of the failure indication event of the system crash restart type, and based on the current quantity of recovery times and the startup stage at which the failure indication event occurred.

11. The method according to claim 1, further comprising:
determining the startup stage at which the failure indication event occurs.

12. The method according to claim 1, wherein performing startup recovery on the terminal device based on the recovery policy comprises:
performing startup recovery on the terminal device based on the preset execution sequence of the recovery policy, wherein the startup recovery continues until a first application program starts, or until all recovery policies corresponding to the type of the failure indication event or to the cause of the failure indication event fail.

13. The method according to claim 1, further comprising:
after startup recovery is performed on the terminal device based on the recovery policy, generating a startup log corresponding to the recovery policy, wherein the startup log comprises: the type of the failure indication event, a startup stage at which the failure indication event occurs, a fault log, the recovery policy, and a recovery result;
when the startup recovery fails, saving the startup log; and when the startup recovery succeeds, uploading, to a log statistics and measurement system, the startup log and a saved startup log of a second recovery policy that has previously failed.

14. A terminal, comprising:
a processor; and
a non-transitory memory, wherein the memory is configured to store a program to be executed by the processor, the program including instructions for:
   determining that a failure indication event has occurred in a startup process of the terminal, wherein the failure indication event indicate a startup failure;
   determining a recovery policy based on a type of the failure indication event or a cause of the failure indication event, and based on a current quantity of recovery times and a startup stage at which the failure indication event occurred, wherein different current quantities of recovery times correspond to different recovery policies, and failure indication events occurring at different startup stages correspond to different recovery policies; and
   performing startup recovery on the terminal based on the recovery policy, wherein when the type of the failure indication event or the cause of the failure indication event and the startup stage at which the failure indication event occurred correspond to a preset execution sequence of recovery policies, a subsequent recovery policy in the preset execution sequence of recovery policies is performed only when recovery does not succeed in response to performing an earlier recovery policy in the preset execution sequence of recovery policies.

15. The terminal according to claim 14, wherein determining the recovery policy based on the type of the failure indication event or the cause of the failure indication event, and based on the current quantity of recovery times and the startup stage at which the failure indication event occurred comprises:
   determining, based on the type of the failure indication event or the cause of the failure indication event, and based on the current quantity of recovery times and the startup stage at which the failure indication event occurred, a recovery policy corresponding to the type of the failure indication event or the cause of the failure indication event, and corresponding to the current quantity of recovery times and the startup stage at which the failure indication event occurred.

16. The terminal according to claim 14, wherein the type of the failure indication event comprises a preset fault type, a startup timeout type, a user force restart type, or a system crash restart type.

17. The terminal according to claim 16, wherein the user force restart type corresponds to a failure indication event caused by:

touching and holding a power button;
pressing a preset combination of buttons; or
pulling out a battery.

18. The terminal according to claim 16, wherein determining the recovery policy based on the type of the failure indication event or the cause of the failure indication event, and based on the current quantity of recovery times and the startup stage at which the failure indication event occurred comprises:
   when the failure indication event is the system crash restart type, determining the recovery policy based on a crash cause of the failure indication event of the system crash restart type, and based on the current quantity of recovery times and the startup stage at which the failure indication event occurred.

19. A non-transitory computer readable storage medium, wherein the storage medium stores computer software instructions used by a terminal, and when the computer software instructions run on a computer, the software instructions cause the terminal to:
   determine that a failure indication event has occurred in a startup process, wherein the failure indication event indicates a startup failure;
   determine a recovery policy based on a type of the failure indication event or a cause of the failure indication event, and based on a current quantity of recovery times and a startup stage at which the failure indication event occurred, wherein different current quantities of recovery times correspond to different recovery policies, and failure indication events occurring at different startup stages correspond to different recovery policies; and
   perform startup recovery based on the recovery policy, wherein when the type of the failure indication event or the cause of the failure indication event and the startup stage at which the failure indication event occurred correspond to a preset execution sequence of recovery policies, a subsequent recovery policy in the preset execution sequence of recovery policies is performed only when recovery does not succeed in response to performing an earlier recovery policy in the preset execution sequence of recovery policies.

20. The non-transitory computer readable storage medium according to claim 19, wherein the storage medium stores a mapping relationship among a plurality of recovery policies, a plurality of stages of startup in which a startup failure may occur, a plurality of quantities of recovery times, a plurality of startup stages, and a plurality of failure indication events or causes of failure indication events, and
   wherein the recovery policy is determined using the mapping relationship.

* * * * *